Jan. 1, 1952     W. C. FILLEBROWN     2,580,748
CENTERING AND CAGING MECHANISM FOR GYROSCOPES
Filed April 29, 1950
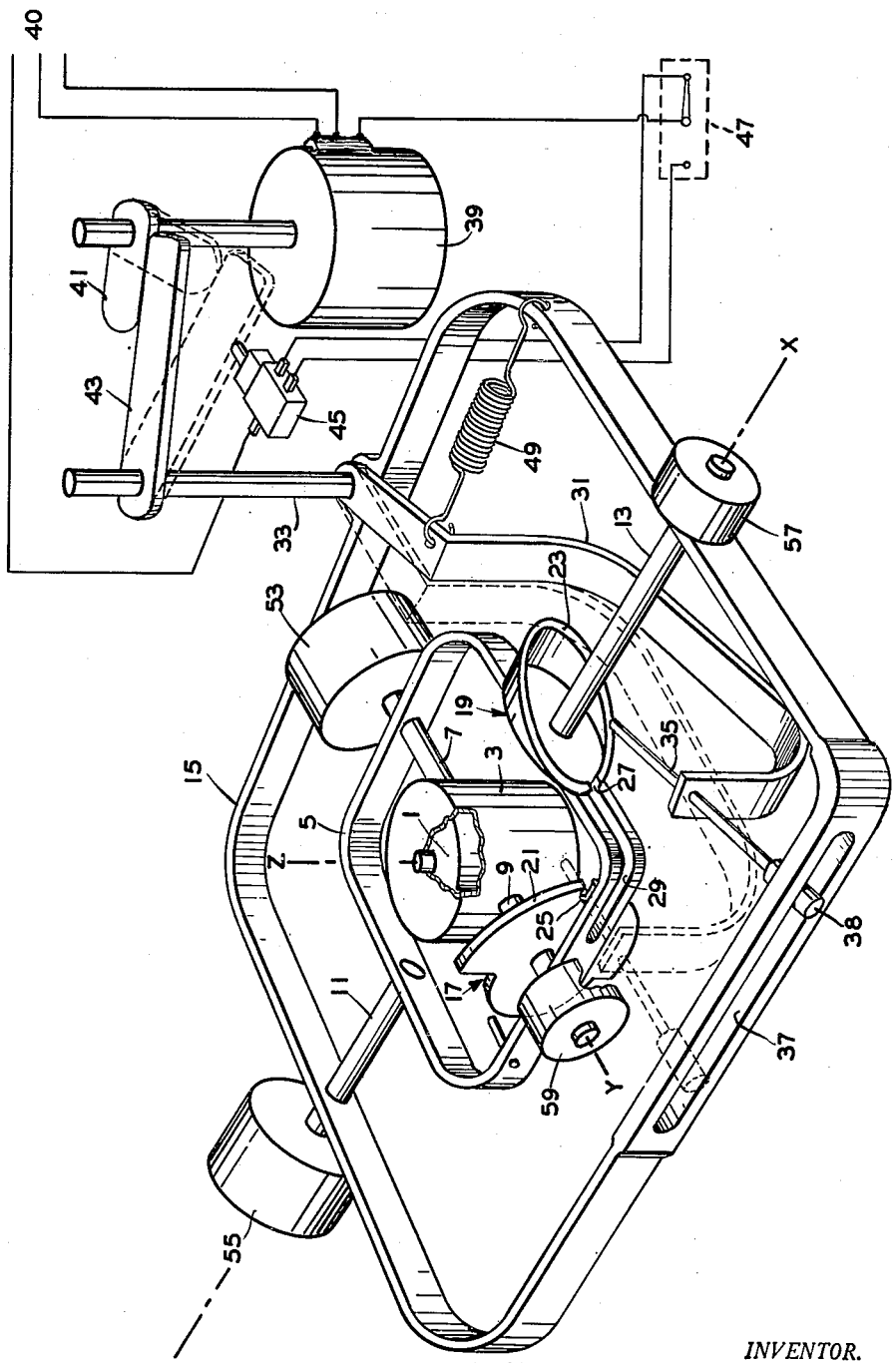
INVENTOR.
WILLIAM C. FILLEBROWN
BY
*S. H. Hartz*
ATTORNEY Patented Jan. 1, 1952

2,580,748

UNITED STATES PATENT OFFICE 2,580,748

CENTERING AND CAGING MECHANISM FOR GYROSCOPES

William C. Fillebrown, Hasbrouck Heights, N. J., assignor to Bendix Aviation Corporation, Teterboro, N. J., a corporation of Delaware Application April 29, 1950, Serial No. 159,084

11 Claims. (Cl. 74—5.1)

The invention relates to gyroscopic devices, such as gyro verticals, artificial horizons, etc., and more particularly to novel mechanism for centering or erecting and caging such devices.

One object of the present invention is to provide a novel mechanism for centering the gyroscope rotor first about one axis and subsequently about a second axis.

Another object is to provide a novel mechanism which will center the gyroscope rotor whether the rotor is spinning or at rest.

Another object is to provide a gyroscope horizon or the like with novel centering and caging mechanism.

Another object is to provide novel centering and caging mechanism supported by the gyroscope housing and operable irrespective of the angle of departure of the rotor from centered position.

Another object is to provide a novel centering and caging mechanism which may be remotely controlled.

The invention contemplates a centering or erecting and caging device for a gyroscope having a rotor spinning in a support about one axis and including a gimbal mounting the support for freedom about mutually perpendicular axes at an angle to the spin axis. The device includes a cam-like member rigid with the gimbal and a second cam-like member rigid with the support. A second support pivotally mounted independently of the gyroscope includes means for successively engaging both the cam-like members to rotate the gimbal and first support about the mutually perpendicular axes until the rotor spin axis assumes a predetermined attitude relative to the gyroscope housing. The support may be pivoted to and from cam-engaging position by a motor and resilient device.

The foregoing and other objects and advantages of the invention will appear more fully hereinafter from a consideration of the detailed description which follows, taken together with the accompanying drawing wherein one embodiment of the invention is illustrated. It is to be expressly understood, however, that the drawing is for the purposes of illustration and description only, and is not to be construed as defining the limits of the invention.

The single figure of the drawing is a schematic perspective view of a gyroscope including a novel centering or erecting and caging mechanism constructed according to the invention.

Referring now to the drawing for a more detailed description of the novel mechanism of the present invention, the mechanism is shown as applied to a gyro vertical including a rotor 1 rotatable within a casing or support 3 for spinning about a normally vertical axis Z. The rotor case is mounted for oscillation about a horizontal pitch axis Y within a gimbal 5 by trunnions 7, 9. The gimbal is mounted for oscillation about a second horizontal roll axis X perpendicular to axis Y by trunnions 11, 13 supported by a housing or frame 15. The gyroscope rotor has three degrees of freedom, and the instrument, when mounted on a craft, has its trunnions 11, 13 extending parallel to the longitudinal craft axis and its trunnions 7, 9 extending parallel to the transverse craft axis.

The novel caging and centering apparatus of the present invention includes a cam 17 secured to trunnion 9 within gimbal 5 and oscillating with the rotor case about pitch axis Y. A cam 19 is secured to trunnion 13 and oscillates with gimbal 5 about roll axis X. Cams 17 and 19 have cam faces 21 and 23, respectively. Cam faces 21 and 23 have detents 25 and 27, respectively, and gimbal 5 has a slot 29 extending lengthwise thereof between the detents for the purposes described hereinafter.

A support 31 is rigid with a pin 33 pivoted to frame 15 and swings between the uncaging position shown in solid lines and the caging position shown in broken lines. A rod-like cam follower 35 is mounted on the support and successively engages both cam faces 23, 21 as support 31 pivots to caging position. A slot 37 in frame 15 receives a roller 38 rotatable on one end of cam follower 35 and guides the cam follower and support as it swings about pin 33. As support 31 pivots toward caging position, cam follower 35 rides on cam face 23 and rotates gimbal 5 about roll axis X until cam follower 35 is positioned in detent 27, whereupon gimbal 5 is centered. Further pivotal movement of support 31 causes cam follower 35 to enter slot 29 in gimbal 5 and ride on cam face 21 and rotate rotor case 3 about the pitch axis Y until cam follower 35 is positioned in detent 25, whereupon the rotor case is centered about both axes.

Support 31 may be pivoted from the solid line uncaging position to the broken line caging position by a motor 39 rotating an arm 41 which engages a lever 43 fixed to pin 33. The motor is energized from a three-phase power source 40. A single-pole-double-throw limit switch 45 and a single-pole-double-throw manual switch 47 are connected in series with the motor and one phase of the power source. Upon closing switch 47, motor 39 is energized and arm 41 pivots lever 43 until support 31 is in caging position, whereupon the lever operates switch 45 and stops motor 39. The gyroscope is uncaged by moving switch 47 to the opposite pole whereupon motor 39 is again energized and arm 41 releases lever 43, and a spring 49, having one end attached to support 31 and its other end attached to frame 15, pivots support 31 to uncaged position. Motor 39 stops when support 31 is in uncaged position and lever 43 releases limit switch 45. The support may be pivoted again to caging position by motor 39 when switch 47 is again moved to the opposite pole.

In some instances it may be desirable to use the motor to pivot the support to uncaging position and to use the spring to pivot the support to caging position.

The novel centering and caging mechanism permits the use of motors 53, 55 to erect the gyroscope spin axis to a predetermined attitude and inductive pick-offs 57, 59 to provide signals corresponding to the relative movement of the rotor case and gimbal about the pitch and bank axes.

The gyroscope is centered first about one axis and subsequently about a second axis, and the gyroscope may be centered whether the rotor is spinning or at rest. The mechanism is operable notwithstanding the angle of departure of the rotor spin axis from normal operating position. The mechanism may be used to erect the gyroscope spin axis to a predetermined attitude after the spin axis departs therefrom, as during a craft turn. For example, the spin axis may be erected to the vertical by operating the centering mechanism when the craft is in straight and level flight.

Although but one embodiment of the invention has been illustrated and described in detail, it is to be expressly understood that the invention is not limited thereto. Various changes can be made in the design and arrangement of the parts without departing from the spirit and scope of the invention as the same will now be understood by those skilled in the art.

What is claimed is:

1. A caging and centering device for a gyroscope comprising the combination with a rotor adapted for spinning in a support about one axis, and means including a gimbal mounting said support for freedom about mutually perpendicular axes other than said spin axis, of means including a member rotatable with said gimbal, a second member rotatable with said support, and a pivoted second support mounted independently of the first support and gimbal and including a single element for engaging both of said members to move the gimbal and first support to centered position.

2. Structure as defined in claim 1 including a motor and resilient means for pivoting said second support relative to the gyroscope to and from centering position.

3. In a gyroscope having a rotor spinning in a support about one axis and means including a gimbal mounting said support for rotation about mutually perpendicular axes inclined to said spin axis, cam-like members rotatable with said gimbal and with said support, and a second support mounted independently of the gimbal and said first support and including a follower for successively engaging said cam-like members to position said gimbal and first support with the rotor spin axis in a predetermined attitude, said gimbal being apertured to receive said follower as said follower moves from one of said members to the other.

4. In a gyroscope having a rotor spinning in a support about one axis, and means including a gimbal mounting said support for rotation about a second axis inclined to said spin axis, and a frame mounting said gimbal for rotation about a third axis perpendicular to said second axis, cam-like members rotatable with said gimbal and said support, and a second support pivoted to said frame and including means for engaging said cam-like members to move said gimbal and first support to a position in which the rotor spin axis is in a predetermined attitude.

5. Structure as defined in claim 4 in which the frame is slotted to receive a portion of the second support to guide the member-engaging means as it moves relative to said members.

6. In a gyroscope having a rotor spinning in a support about one axis and means including a gimbal mounting said support for rotation about a second axis inclined to said spin axis, and a frame mounting said gimbal for rotation about a third axis perpendicular to said second axis, cam-like members rotatable with said gimbal and said support, a second support pivoted to said frame and including a cam follower for successively engaging said members to rotate said gimbal and first support successively about the second and third axes so that the rotor spin axis is in a predetermined attitude, said frame being slotted to receive a portion of said second support to guide said cam follower as it moves relative to said members, and said gimbal being apertured to receive said follower as said follower moves from one of said members to the other.

7. Structure as described in claim 6 including a motor for pivoting said second support relative to the gyroscope in one direction and a spring for pivoting said second support relative to the gyroscope in the opposite direction.

8. In a gyroscope having a rotor spinning in a support about one axis and means including a gimbal mounting said support for rotation about a second axis inclined to said spin axis and a frame mounting said gimbal for rotation about a third axis perpendicular to said second axis, cam-like members rotatable with said gimbal and with said support, a second support pivoted to said frame and including means for engaging said cam-like members to position said gimbal and first support with the rotor spin axis in a predetermined attitude, and inductive devices associated with said gimbal and said first support to provide signals corresponding to the movement of said gimbal and first support about said second and third axes.

9. In a gyroscope having a rotor spinning in a support about one axis and means including a gimbal mounting said support for rotation about a second axis inclined to said spin axis and a frame mounting said gimbal for rotation about a third axis perpendicular to said second axis, cam-like members rotatable with said gimbal and with said support, a second support pivoted to said frame and including means for engaging said cam-like members to position said gimbal and first support with the rotor spin axis in a predetermined attitude, motors associated with said gimbal and with said first support for erecting the spin axis about said second and third axes to a predetermined attitude, and inductive devices associated with said gimbal and said first support to provide signals corresponding to the movement of said gimbal and first support about said second and third axes.

10. In a gyroscope having a rotor spinning in a support about one axis, means including a gimbal mounting said support for rotation about mutually perpendicular axes inclined to said spin axis, cam-like members rotatable with said gimbal and with said support, a pivoted second support mounted independently of the gimbal and first support and including means for engaging said cam-like members to position said gimbal and first support with the rotor spin axis in a predetermined attitude, a motor driving said second support to member-engaging position, and a limit switch actuated by said second support to de-energize said motor when said spin axis is in said predetermined attitude.

11. In a gyroscope having a rotor spinning in a support about one axis, means including a gimbal mounting said support for rotation about mutually perpendicular axes inclined to said spin axis, cam-like members rotatable with said gimbal and with said support, a pivoted second support mounted independently of the gimbal and first support and including means for engaging said cam-like members to position said gimbal and first support with the rotor spin axis in a predetermined attitude, a motor driving said second support to member-engaging position for erecting the gyroscope, a limit switch actuated by movement of said second support to de-energize said motor when said spin axis is erected to said predetermined attitude, and a spring to pivot said second support and disengage said means from said members.

WILLIAM C. FILLEBROWN.

REFERENCES CITED

The following references are of record in the file of this patent:

UNITED STATES PATENTS

| Number | Name | Date |
|---|---|---|
| 2,468,016 | Konet | Apr. 19, 1949 |
| 2,491,813 | Jordan | Dec. 20, 1949 |
| 2,507,451 | Molnar et al. | May 9, 1950 |
| 2,524,553 | Wendt | Oct. 3, 1950 |